(12) United States Patent
Moon et al.

(10) Patent No.: US 12,193,466 B2
(45) Date of Patent: Jan. 14, 2025

(54) FOOD FREEZING APPARATUS AND FOOD PROCESSING SYSTEM

(71) Applicant: CJ CHEILJEDANG CORPORATION, Seoul (KR)

(72) Inventors: Sung Yang Moon, Suwon-si (KR); Doo Seong Jeong, Suwon-si (KR); Gun Woo Lee, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 163 days.

(21) Appl. No.: 18/022,940

(22) PCT Filed: May 31, 2021

(86) PCT No.: PCT/KR2021/006711
§ 371 (c)(1),
(2) Date: Feb. 23, 2023

(87) PCT Pub. No.: WO2022/085887
PCT Pub. Date: Apr. 28, 2022

(65) Prior Publication Data
US 2023/0301331 A1    Sep. 28, 2023

(30) Foreign Application Priority Data
Oct. 19, 2020   (KR) .................. 10-2020-0135504

(51) Int. Cl.
*A23L 3/36*   (2006.01)
*A23L 3/00*   (2006.01)

(52) U.S. Cl.
CPC .............. *A23L 3/361* (2013.01); *A23L 3/001* (2013.01); *A23V 2300/20* (2013.01)

(58) Field of Classification Search
CPC . A23L 3/361; A23L 3/001; A23L 3/36; A23L 5/13; A23V 2300/20;
(Continued)

(56) References Cited

U.S. PATENT DOCUMENTS 2,422,536 A * 6/1947 Finnegan ................ A23L 3/361
34/212
4,570,447 A     2/1986 Jonasson
(Continued)

FOREIGN PATENT DOCUMENTS

CN    110595136 A    12/2019
JP    S61-47174 A    3/1986
(Continued)

OTHER PUBLICATIONS

International Search Report issued in corresponding International Patent Application No. PCT/KR2021/006711 dated Aug. 30, 2021.
(Continued)

*Primary Examiner* — Emmanuel E Duke
(74) *Attorney, Agent, or Firm* — Morgan, Lewis & Bockius LLP

(57) ABSTRACT

A food freezing apparatus according to the present invention comprises: a transport unit having multiple vertically spaced levels provided so as to continuously transport food; a cooling unit for cooling the food transported by the multiple levels of the transport unit; a pre-freezing unit for pre-freezing the food transported by the multiple levels of the transport unit after having been cooled; a freezing unit for freezing the food transported by the multiple levels of the transport unit after having been pre-frozen; and a defrosting unit connected to the freezing unit so as to remove frost that forms inside the freezing unit.

15 Claims, 11 Drawing Sheets

FRONT ◀──────▶ REAR

(58) Field of Classification Search
CPC . A23V 2300/31; A23V 2002/00; F25D 13/06; F25D 17/06; F25D 21/10; F25D 23/023
See application file for complete search history.

(56) References Cited

U.S. PATENT DOCUMENTS

| | | |
|---|---|---|
| 6,146,600 A | 11/2000 | Williamson |
| 11,751,580 B2 | 9/2023 | Ota et al. |
| 2022/0061342 A1 | 3/2022 | Ota et al. |

FOREIGN PATENT DOCUMENTS

| | | |
|---|---|---|
| JP | S62-13976 A | 1/1987 |
| JP | H07-23868 A | 1/1995 |
| JP | H07-318230 A | 12/1995 |
| JP | H11-23137 A | 1/1999 |
| JP | 2987590 B1 | 12/1999 |
| JP | 2000-356448 A | 12/2000 |
| JP | 3440157 B2 | 8/2003 |
| JP | 2018-179397 A | 11/2018 |
| KR | 10-0285501 B1 | 4/2001 |
| KR | 10-0529831 B1 | 11/2005 |
| KR | 10-1663828 B1 | 10/2016 |
| KR | 10-2018-0036035 A | 4/2018 |
| KR | 10-2020-0016645 A | 2/2020 |
| KR | 10-2020-0033827 A | 3/2020 |
| WO | 2020-149300 A1 | 7/2020 |

OTHER PUBLICATIONS

Office Action issued in corresponding Chinese Patent Application No. 202180064721.7, dated Jul. 22, 2024 with a partial English translation.

Partial Supplementary European Search Report issued in corresponding European Application No. 21882962.0 dated Oct. 8, 2024.

\* cited by examiner

FOOD FREEZING APPARATUS AND FOOD PROCESSING SYSTEM

TECHNICAL FIELD

The present invention relates to a food freezing apparatus and food processing system that produce frozen foods.

BACKGROUND ART

Food steaming and freezing processes for producing frozen foods, particularly frozen dumplings, may be continuously performed. A product line used in the food steaming and freezing processes may be configured in such a method that when foods are seated on a single conveyor and transferred, an appropriate process is performed on the transferred foods.

The processes may be used to produce large quantities of frozen foods. However, as a demand for the frozen foods such as frozen dumplings, rapidly increases, enough frozen foods are difficult to produce for a given time period in restricted equipments. In order to increase an amount of the production, a method of disposing multiple identical equipments may be used. There is a limitation that an additional equipment is difficult to practically install due to economic factors and spatial constraints.

Moreover, there is a limitation such as the steamed foods covered with frost during rapidly cooling for post-treatment.

DISCLOSURE OF THE INVENTION

Technical Problem

The present invention has been devised to solve the problems as above, and one aspect of the present invention is to provide a food freezing apparatus and food processing system capable of producing large quantities of frozen foods in a restricted space.

An object of the present invention for solving the above problems is to provide a food freezing apparatus and food processing system capable of appropriately processing foods separately according to a position of the foods.

Technical Solution

A food freezing apparatus according to an embodiment of the present invention includes: a transport unit having multiple vertically spaced levels provided so as to continuously transport food; a cooling unit provided to cool the food transported by the multiple levels of the transport unit; a pre-freezing unit provided to pre-freeze the food transported by the multiple levels of the transport unit after having been cooled; a freezing unit provided to freeze the food transported by the multiple levels of the transport unit after having been pre-frozen; and a defrosting unit connected to the freezing unit so as to remove frost that forms inside the freezing unit.

A food processing system according to an embodiment of the present invention includes: a transport unit having multiple vertically spaced levels provided so as to continuously transport food; a steaming unit provided to steam the food transported by the multiple levels of the transport unit; and a freezing unit provided to freeze the food transported by the multiple levels of the transport unit after having been steamed.

Advantageous Effects

Accordingly, the large quantities of frozen foods may be produced in the restricted space, and the appropriate processing may be performed separately according to the position of the foods to reduce the occurrence of the frost.

MODE FOR CARRYING OUT THE INVENTION

Figure 1:
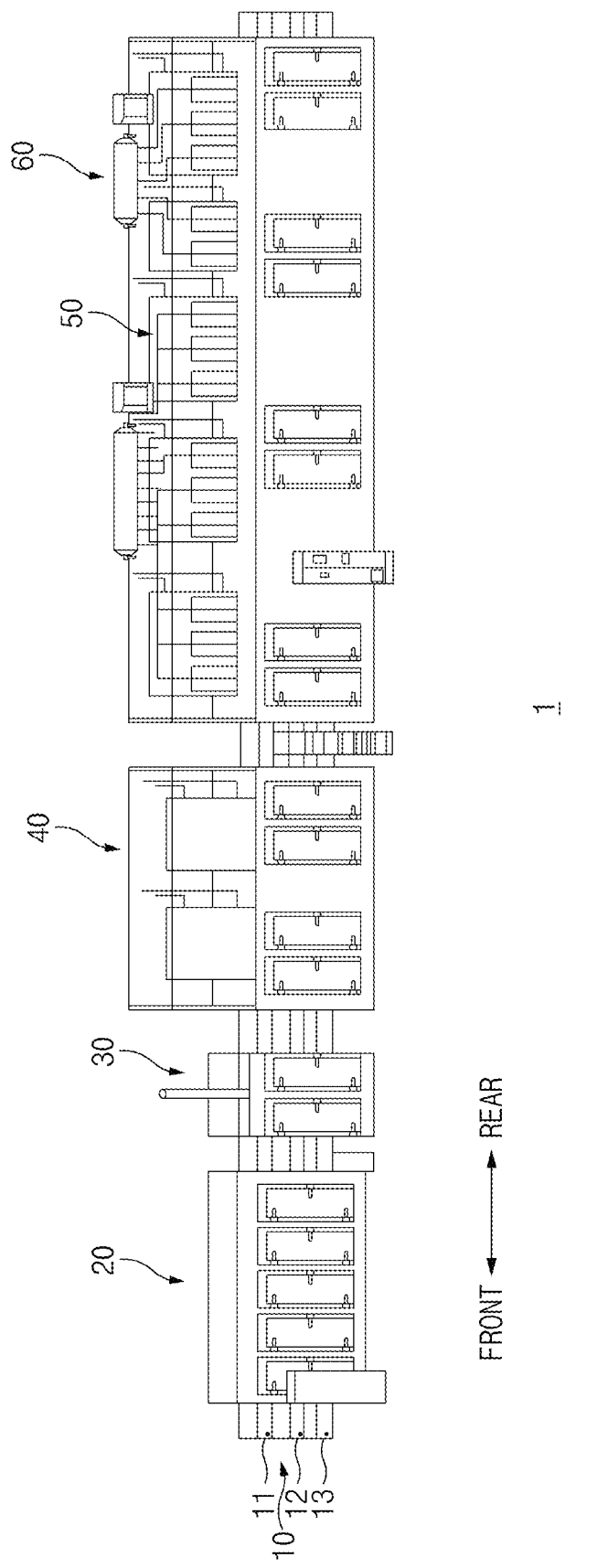
FIG. 1 is a perspective view of a food processing system according to an embodiment of the present invention.

Hereinafter, some embodiments of the present invention will now be described in detail with reference to the accompanying drawings. Note that like components in the drawings are designated by like reference numerals as far as possible even if they are shown in different drawings. In the following description of the present invention, a detailed description of known functions and configurations incorporated herein will be omitted to avoid making the subject matter of the present invention unclear.

In the description of the elements of the present invention, the terms "first", "second", "A", "B", "(a)", and "(b)" may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to", "engaged with", or "connected to" the other element between them.

Figure 2:
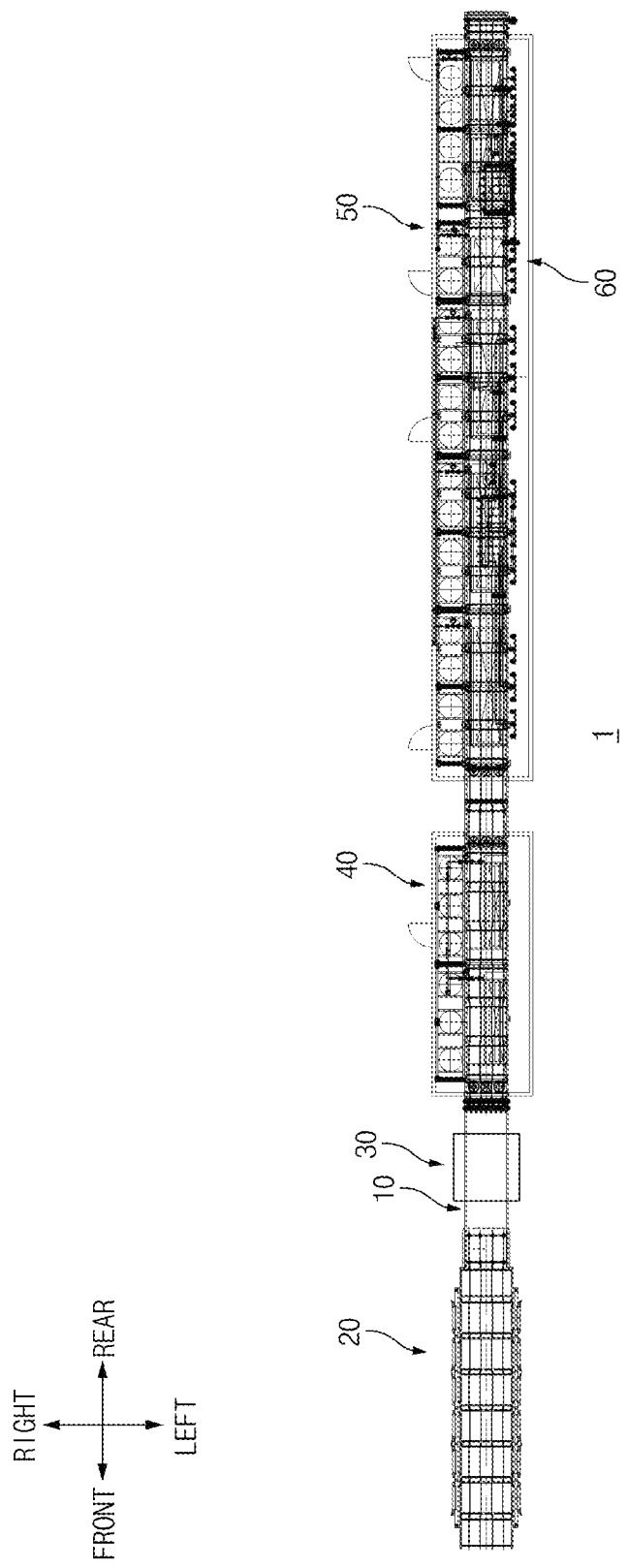
FIG. 2 is a plan view of a food processing system according to an embodiment of the present invention in a state in which an inner structure of the food processing system is exposed.
Figure 3:
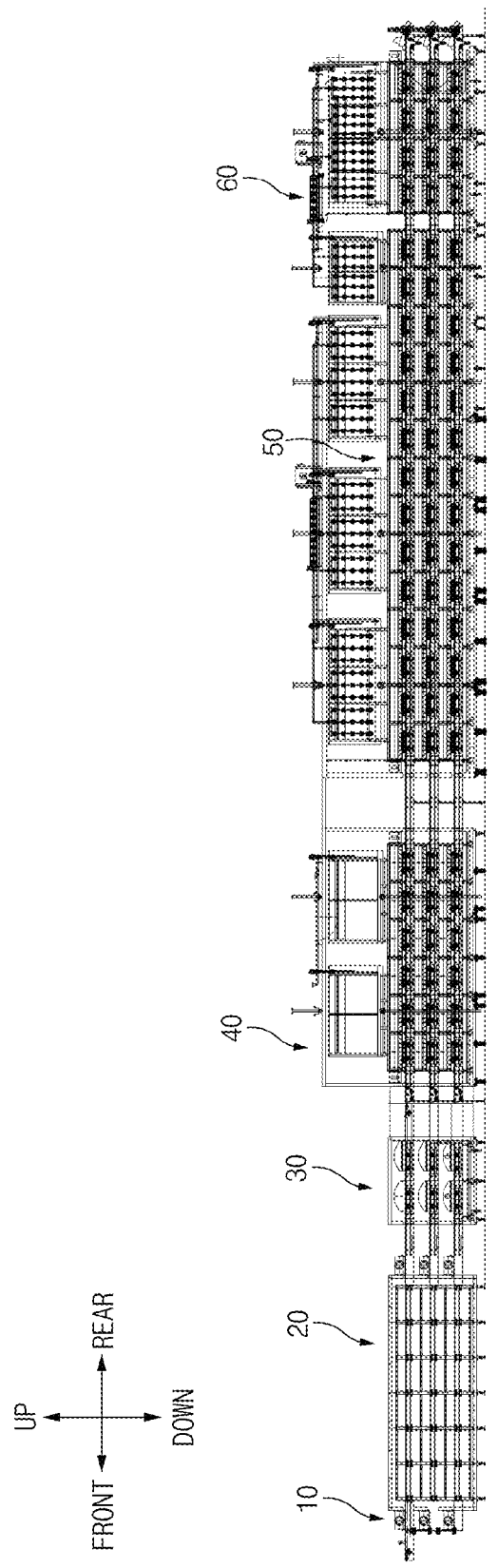
FIG. 3 is a side view of a food processing system according to an embodiment of the present invention in a state in which an inner structure of the food processing system is exposed.
Figure 4:
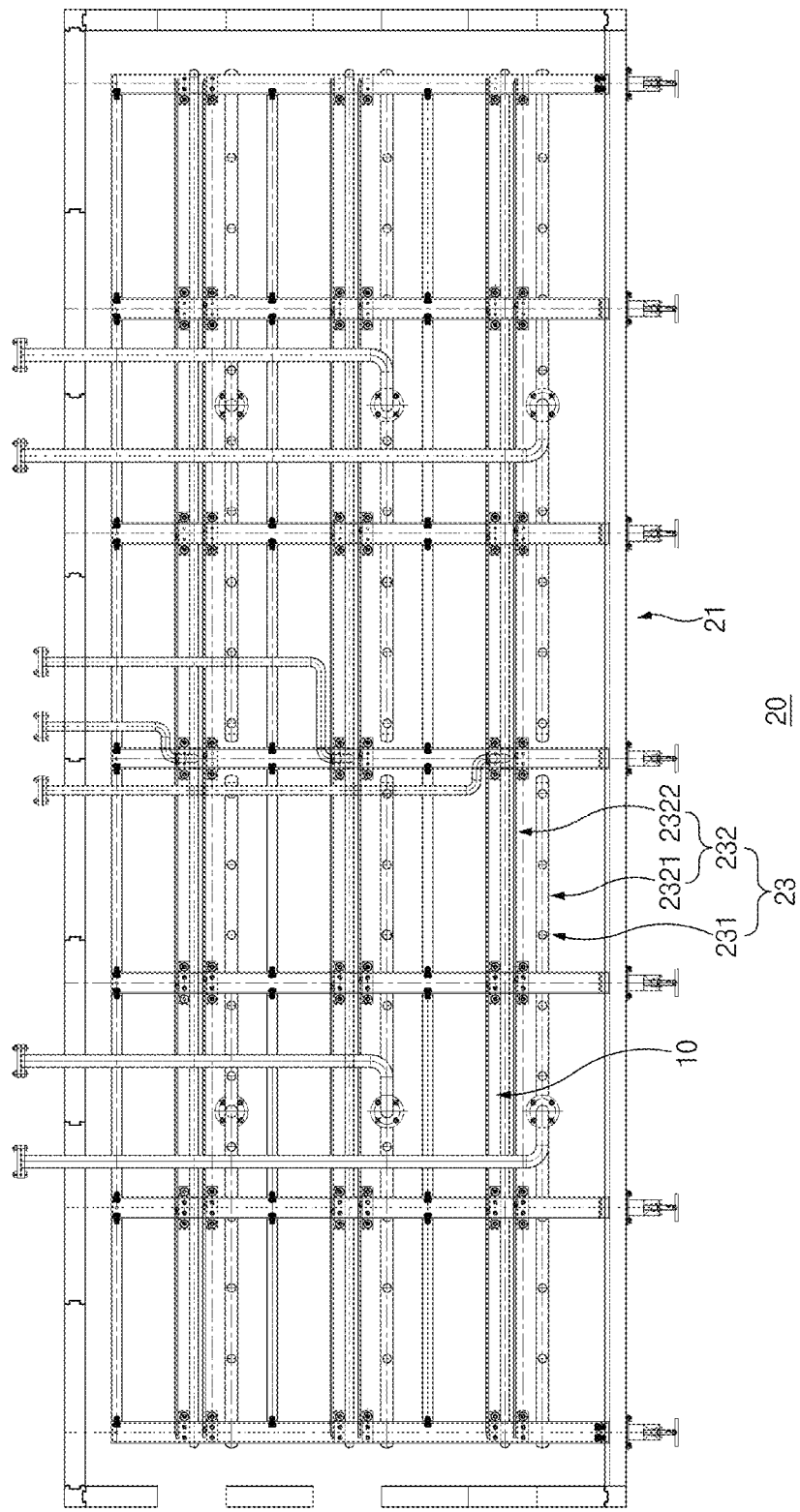
FIG. 4 is a side view of a steaming unit of a food processing system according to an embodiment of the present invention in a state in which an inner structure of the steaming unit is exposed.
Figure 5:
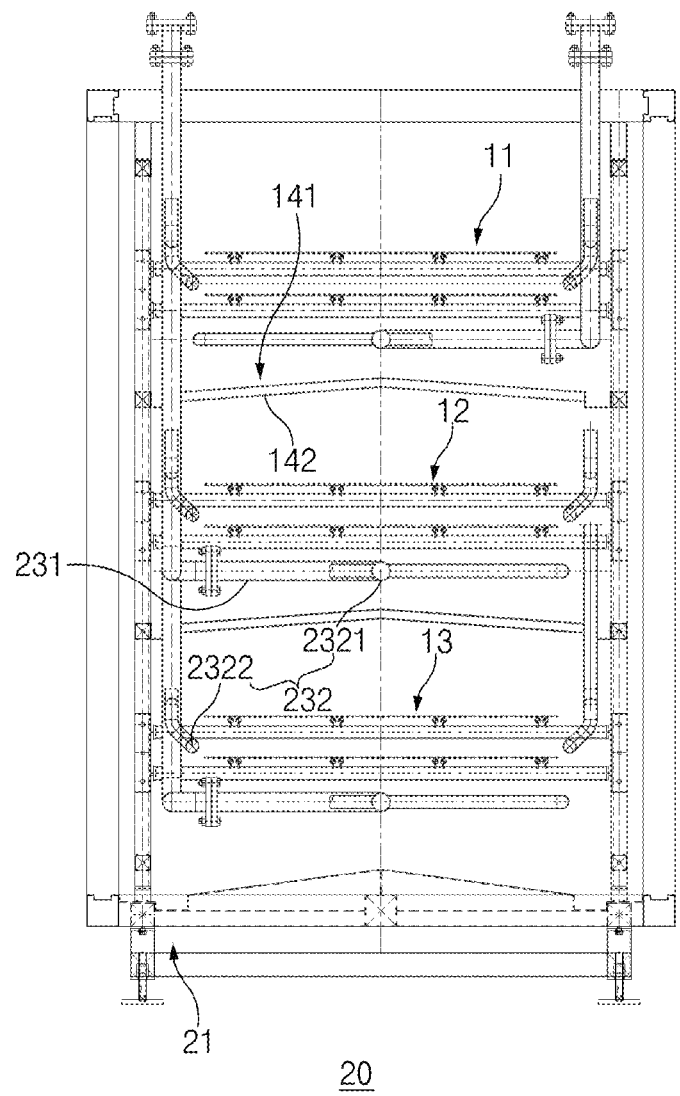
FIG. 5 is a front view of a steaming unit according to an embodiment of the present invention in a state in which an inner structure of the steaming unit is exposed.
Figure 6:
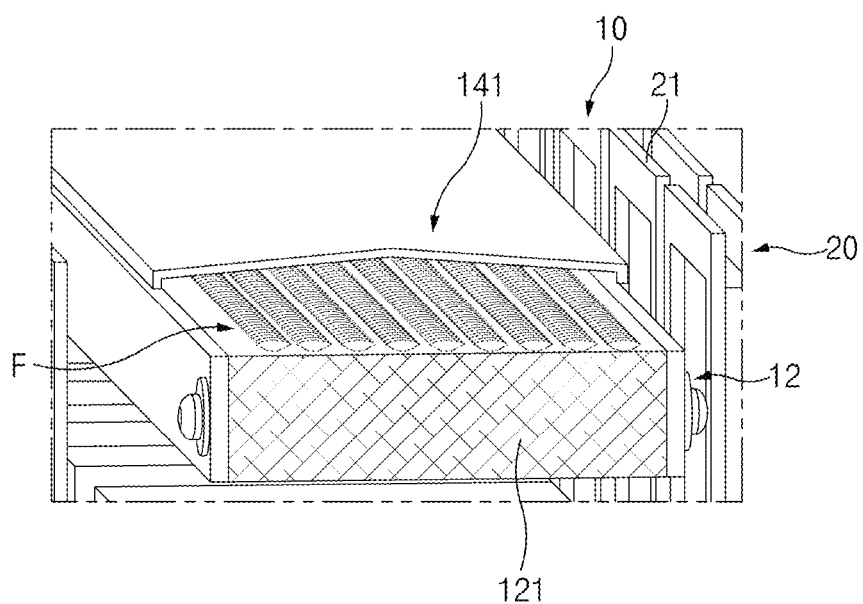
FIGS. 6 and 7 are views illustrating a portion of an inner structure of a steaming unit according to an embodiment of the present invention.
Figure 7:
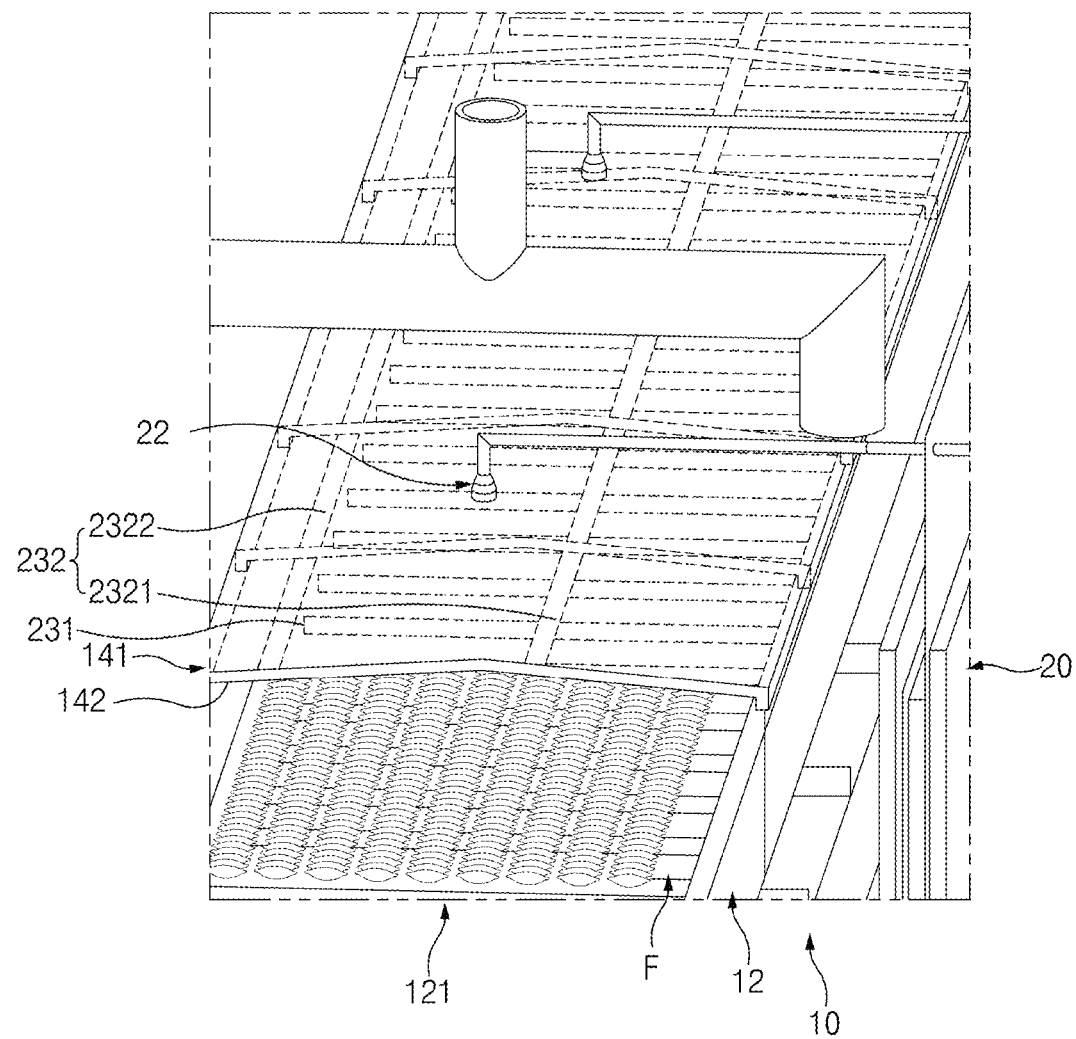

FIG. 1 is a perspective view of a food processing system 1 according to an embodiment of the present invention. FIG. 2 is a plan view of the food processing system 1 according to an embodiment of the present invention in a state in which an inner structure of the food processing system 1 is exposed. FIG. 3 is a side view of the food processing system 1 according to an embodiment of the present invention in the state in which the inner structure of the food processing system 1 is exposed. FIG. 4 is a side view of a steaming unit 20 of the food processing system 1 according to an embodiment of the present invention in a state in which an inner structure of the steaming unit 20 is exposed. FIG. 5 is a front view of the steaming unit 20 according to an embodiment of the present invention in the state in which the inner structure of the steaming unit 20 is exposed. FIGS. 6 and 7 are views illustrating a portion of the inner structure of the steaming unit 20 according to an embodiment of the present invention.

Referring to the drawings, a food processing system 1 according to an embodiment of the present invention may include a transport unit 10, a steaming unit 20, a freezing unit 50, and a defrosting unit 60. The food processing system 1 may include a cooling unit 30 and a pre-freezing unit 40, and the transport unit 10, the cooling unit 30, the pre-freezing unit 40, and the freezing unit 50 may constitute a food freezing apparatus. The cooling unit 30 and the pre-freezing unit 40 may constitute a cooler. The steaming unit 20, the cooling unit 30, the pre-freezing unit 40, and the freezing unit 50 may be sequentially disposed in a direction from the front to the rear.

Transport Unit 10

The transport unit 10 is a component provided to continuously transport foods F. The transport unit 10 may include multiple levels. The levels 11, 12 and 13 of the transport unit 10 may be disposed apart from each other vertically. As in an embodiment of the present invention, the transport unit 10 may include a first transport level 11, a second transport level 12, and a third transport level 13 in order in a downward direction, but the number of the levels is not limited thereto.

A food supply equipment may be disposed in front of the transport unit 10. The food supply equipment may be disposed parallel to each of the levels 11, 12 and 13 of the transport unit 10. Alternatively, the food supply equipment may be disposed in a left and right direction of each of the levels 11, 12 and 13 and transfer the foods F to the transport unit 10 in the left and right direction, or the food supply equipment may be a rotary supply equipment having a rotating structure, but not transfer the foods F to the transport unit 10 through a path formed by a straight line. The type of the food supply equipment is not limited thereto.

Each of the levels 11, 12 and 13 of the transport unit 10 may include a conveyor 121 provided to transport the foods F. The conveyor 121 may extend in a front and rear direction and be provided so that a plurality of foods F may be arranged in the front and rear direction and the left and right direction. The conveyor 121 may include a plurality of rollers and a belt wound on an outer circumference of each of the plurality of rollers and allow the belt to rotate by rotation of the rollers so that the foods F disposed on a top surface of the belt may be transported in a predetermined direction. In an embodiment of the present invention, as the rollers rotate in an axial direction that is the left and right direction perpendicularly crossing the front and rear direction, the belt may transfer the foods F in a rear direction. In the present disclosure, front and rear, left and right, and upward and downward directions are relative directions used for convenience of explanation and may change according to arrangement of the food processing system 1.

In order to drive the conveyor 121, the transport unit 10 may further include a driving module including a motor, which generates a rotational driving force and transmits the rotational driving force to the rollers, and so on. A single conveyor 121 may be disposed over the entirety of the food processing system 1 in the front and rear direction. Alternatively, the conveyor 121 may be divided for a predetermined section, and a plurality of consecutive conveyor units may constitute the conveyor 121. When the conveyor 121 includes the plurality of conveyor units, different driving modules may be disposed in the conveyor units and drive the conveyor units, respectively.

Each of the levels 11, 12 and 13 of the transport unit 10 may further include a transport cover 141 that covers the conveyor 121 at upper side of the conveyor 121 passing through the inside of the steaming unit 20. As the transport cover 141 covers the conveyor 121, a steaming separation space in which the conveyor 121 is disposed between a lower side of the transport cover 141 and a steam pipe may be defined in each of the levels 11, 12 and 13, and the respective steaming separation spaces of the levels 11, 12 and 13 may be separated from each other. The first transport level 11 may define a first steaming separation space without including the transport cover 141 because another transport level to be disposed on the conveyor is absent. The transport cover 141 of the second transport level 12 may separate the conveyor 121 of the second transport level 12 from the first transport level 11 and define a second steaming separation space. In the drawings, the second transport level 12 and the transport cover 141 disposed thereon are illustrated. The transport cover of the third transport level 13 may separate the conveyor of the third transport level 13 from the second transport level 12 and define a third steaming separation space. The characteristics resulting from the separating of the respective steaming separation spaces from each other will be described later.

The transport cover 141 may have a shape that is upwardly inclined toward the inside based on the left and right direction. Thus, the transport cover 141 may have a shape in which a distance from the transport cover 141 to the conveyor 121 gradually increases toward a center. As the transport cover 141 has such a shape, water may be guided to drop to the outside in the left and right direction even when the water is formed at a bottom surface of the transport cover 141 due to steam. Accordingly, the water may be prevented from dropping to the foods F disposed at the center in the left and right direction.

Each of the levels 11, 12 and 13 of the transport unit 10 may further include a baffle plate 142 protruding from the bottom surface of the transport cover 141 toward the conveyor 121. The baffle plate 142 may extend in the left and right direction and be provided in plurality to be disposed apart from each other in the front and rear direction. Similarly to the transport cover 141 when viewed in the front and rear direction, the baffle plate 142 may have a shape that is upwardly inclined toward the inside based on the left and right direction, and have a predetermined thickness in the upward and downward direction. The baffle plate 142 may further separate each of the steaming separation spaces, which are separated from each other in the upward and downward direction, in the front and rear direction.

The baffle plate 142 may accommodate a thermal insulation material therein. The thermal insulation material may be glass wool, but the type thereof is not limited thereto. As the baffle plate 142 accommodates the thermal insulation material, the steaming separation spaces may be effectively thermally insulated from each other.

Steaming Unit 20

The steaming unit 20 is a part provided to perform steam processing for cooking the foods F using steam. The steaming unit 20 may perform the steam processing on the foods F transported by the transport unit 10. The steaming unit 20 may include a steaming chamber 21 for defining a steaming space therein, and may include a steam providing means disposed in the steaming chamber 21. The steam providing means may be provided in plurality.

The steaming chamber 21 may have a shape of a box that is opened in the front and rear direction. The transport unit 10 may pass through openings of the steaming chamber 21 in the front and rear direction. Thus, the foods F, which are transferred by the transport unit 10 in the rear direction, may be steamed while passing through the steaming space. For the effective steaming, steaming gates capable of temporarily closing the openings in the front and rear direction to seal or open the steaming space may be disposed in the openings in the front and rear direction.

The steam providing means may be disposed at a position corresponding to each of the levels 11, 12 and 13 of the transport unit 10 having the multiple levels and forcibly supply the steam to each of the steaming separation spaces. Thus, the steam providing means may include a steam generation means, which heats the water to generate the steam, and a steam discharging means 23 which discharges the steam generated from the steam generation means to each of the steaming separation spaces. The steam generation means may be a water heater, and the steam discharging means 23 may be provided in a pipe type.

Among the plurality of steam providing means, the steam providing means disposed at the positions corresponding to different levels, respectively, may operate independently of each other. Thus, the temperature and discharge amount of the steam, which is discharged into the steaming separation space corresponding to each of the transport levels 11, 12 and 13, may be different according to situations. For such individual control, a steaming temperature sensor that obtains the temperature may be disposed in each of the steaming separation spaces. The steam providing means corresponding to the steaming temperature sensor may be controlled according to the temperature obtained by the steaming temperature sensor.

The steam discharging means 23 may be disposed below the conveyor 121 included in each of the transport levels 11, 12 and 13 and discharge the steam upwardly to steam the foods F seated and transferred on the top surface of the conveyor 121. The steam discharging means 23 may include left-right pipes 231 and front-rear pipes 232, which receive the steam from the steam generation means and allow the steam to flow therein. The left-right pipes 231 may extend in the left and right direction, and the front-rear pipes 232 may extend in the front and rear direction.

The plurality of front-rear pipes 232 may be disposed at both ends and a center of the conveyor 121 in the left and right direction, and the plurality of left-right pipes 231 may be disposed at predetermined intervals between the front-rear pipes 232 in the front and rear direction. Steam discharge holes or nozzles may be upwardly defined at predetermined intervals in the left-right pipes 231 and the front-rear pipes 232 in the left and right direction and the front and rear direction, respectively. Due to such arrangement of the front-rear pipes 232 and the left-right pipes 231, the foods F in the steaming separation space may be uniformly steamed by the injected steam. The temperature in the steaming unit 20 may be 95° C. to 99° C., and the foods F discharged from the steaming unit 20 may have a temperature of 75° C. to 85° C., preferably 80° C.

The left-right pipes 231 may be communicated with a central front-rear pipe 2321 of the front-rear pipes 232, which is disposed at the center. Thus, the central front-rear pipe 2321 may provide each of the left-right pipes 231 with the steam. The front-rear pipe 232 may include the central front-rear pipe 2321 and an outer front-rear pipe 2322 disposed at each of left and right sides of the central front-rear pipe 2321. The outer front-rear pipe 2322 may be disposed at a center of the conveyor 121 in the upward and downward direction and at each of both sides of the conveyor 121 in the left and right direction. The central front-rear pipe 2321 may be disposed at a lower side of the conveyor 121 in the upward and downward direction and at a center of the conveyor 121 in the left and right direction. That is, the central front-rear pipe 2321 may be disposed downward from the outer front-rear pipe 2322.

Figure 8:
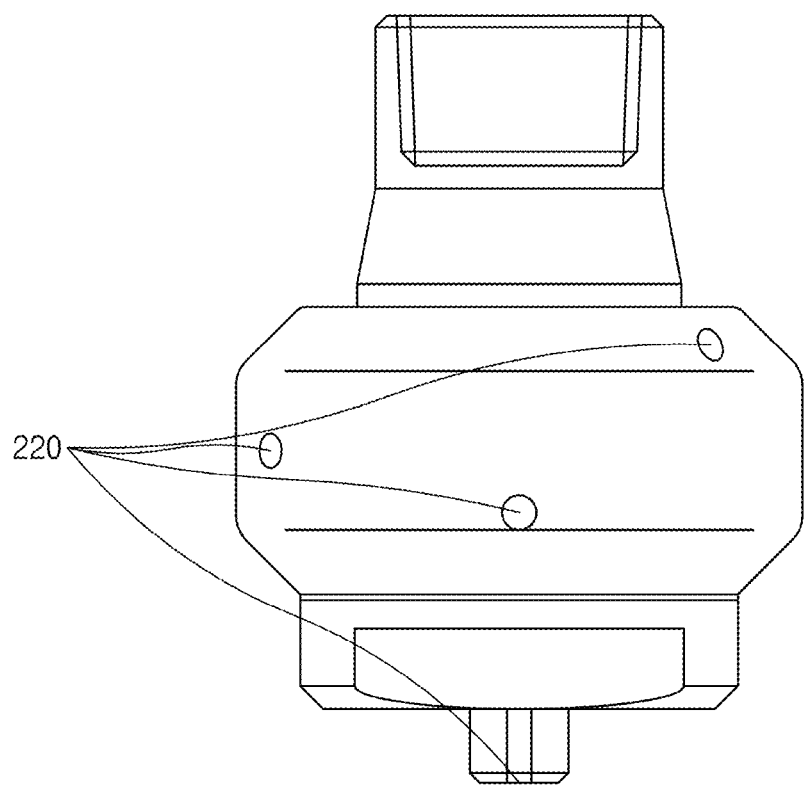
FIG. 8 is a view illustrating a shape of a nozzle that is disposed in a steaming unit according to an embodiment of the present invention.

FIG. 8 is a view illustrating a shape of a nozzle that is disposed in a steaming unit 20 according to an embodiment of the present invention.

A steaming cleaning means for cleaning a steaming space may be disposed in the steaming unit 20. The steaming cleaning means may include a steaming cleaning tubing, which allows air, steam, cleaning water, cleaning agents, and the like, to flow, and a steaming nozzle 22 for discharging a material flowing in the steaming cleaning tubing into the steaming space. The steaming nozzle 22 may have a plurality of steaming nozzle holes 220 opened in various direction as illustrated in FIG. 8 so that the material may be injected in various direction such as upward, lateral, and downward directions, not simply injected in a downward direction, and the material may be injected while drawing a conical line. The steaming nozzle 22 may be rotatably coupled to the steaming cleaning tubing and inject the material while rotating without a blind spot in the steaming space.

Figure 9:
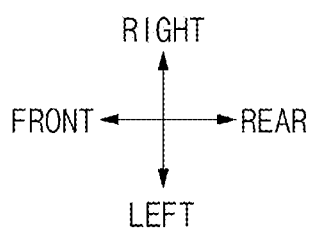
FIG. 9 is a view illustrating a steaming door part of a steaming unit according to an embodiment of the present invention.
Figure 9:
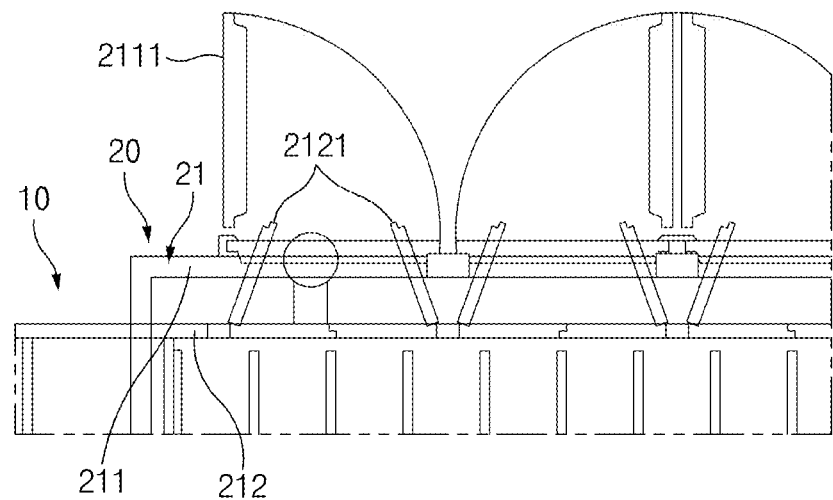

FIG. 9 is a view illustrating steaming door parts 2111 and 2121 of a steaming unit 20 according to an embodiment of the present invention.

A steaming chamber 21 may have a dual structure. That is, the steaming chamber 21 may have a shape in which an outer steaming chamber 211 surrounds an inner steaming chamber 212 defining a steaming space. Openings may be further defined in the steaming chamber 21 in the left and right direction. Each of the steaming door parts 2111 and 2121 may be provided to open and close the openings in the left and right direction.

The steaming door parts 2111 and 2121 may include an inner steaming door 2121, which opens and closes the opening of the inner steaming chamber 212, and an outer steaming door 2111 disposed outside the inner steaming door 2121 in the left and right direction so as to open and close the opening of the outer steaming chamber 211. That is, the steaming door parts 2111 and 2121 may have a dual door structure to prevent an accident that may occur by leakage of the steam filled in the steaming space. For the appropriate processing, a user may open the outer steaming door 2111 and then open the inner steaming door 2121 to approach the steaming space.

Cooling Unit 30, Pre-Freezing Unit 40 and Freezing Unit 50

Figure 10:
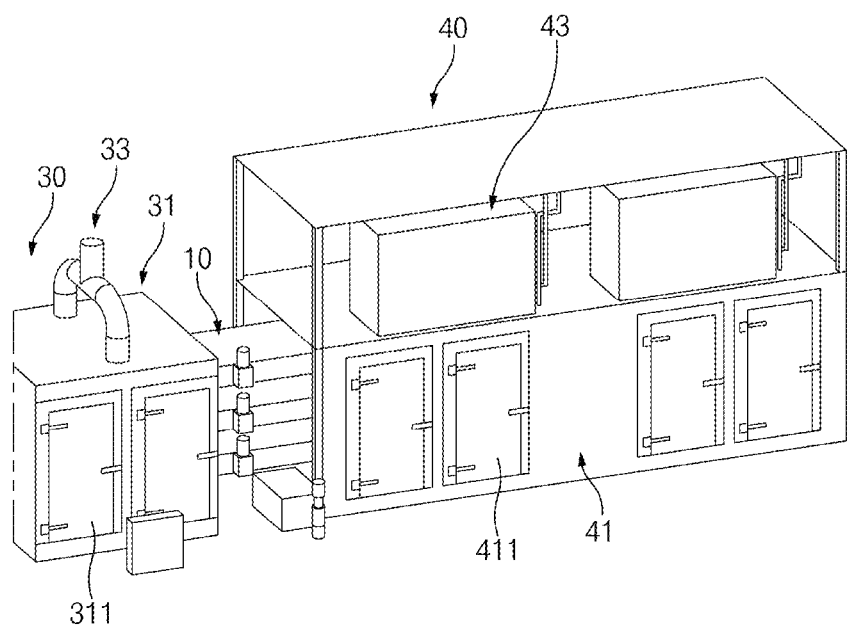
FIG. 10 is a perspective view illustrating a cooling unit and a pre-freezing unit of a food processing system according to an embodiment of the present invention.

FIG. 10 is a perspective view illustrating the cooling unit 30 and the pre-freezing unit 40 of the food processing system 1 according to an embodiment of the present invention.

The cooling unit 30 is a component provided to perform cooling on the foods F transported from the steaming unit 20 by the transport unit 10. The cooling means a method of cooling the foods F by exposing the foods F to outside air or allowing the outside air to flow around the foods F, without using a separate refrigerant or the like.

The cooling unit 30 may include a cooling chamber 31 for defining a cooling space therein, and the cooling chamber 31 may have an opening opened through which the outside air enters and exits the cooling space. The cooling unit 30 may include an outside air providing means 33 disposed in the cooling chamber 31 to forcibly supply the outside air to the cooling space. The cooling unit 30 may be disposed behind the steaming unit 20.

The cooling chamber 31 may have a shape of a box that is opened in the front and rear direction. The transport unit 10 may pass through openings of the cooling chamber 31 in the front and rear direction. Thus, the foods F transferred by the transport unit 10 in the rear direction may be cooled while passing through the cooling space.

The pre-freezing unit 40 is a component provided to pre-freeze the foods F cooled and transported by the transport unit 10. The pre-freezing means a method of cooling the foods F by allowing air cooled using a refrigerant to flow around the foods F. The pre-freezing unit 40 may be disposed behind the cooling unit 30.

The pre-freezing unit 40 may include a pre-freezing chamber 41 for defining a pre-freezing space therein. The pre-freezing chamber 41 may have a shape of a box that is opened in the front and rear direction. The transport unit 10 may pass through openings of the pre-freezing chamber 41 in the front and rear direction. Thus, the foods F transferred by the transport unit 10 in the rear direction may be pre-frozen while passing through the pre-freezing space.

The pre-freezing unit 40 may include a pre-freezing air providing means disposed in the pre-freezing chamber 41 to forcibly supply the air cooled with the refrigerant to the pre-freezing space. The pre-freezing unit 40 may include a pre-freezing air generation means 43 capable of cooling the air through heat exchange between the refrigerant and the air and providing the pre-freezing air providing means with the cooled air. The pre-freezing air generation means 43 may be disposed above the pre-freezing chamber 41. The pre-freezing air generation means 43 may be a brine cooler using an indirect cooling method, using a refrigerant including salt water or the like.

The temperature in the pre-freezing unit 40 may be 3° C. to 7° C., preferably 5° C., and the foods F discharged from the pre-freezing unit 40 may have a temperature of 35° C. to 45° C., preferably 40° C.

Figure 11:
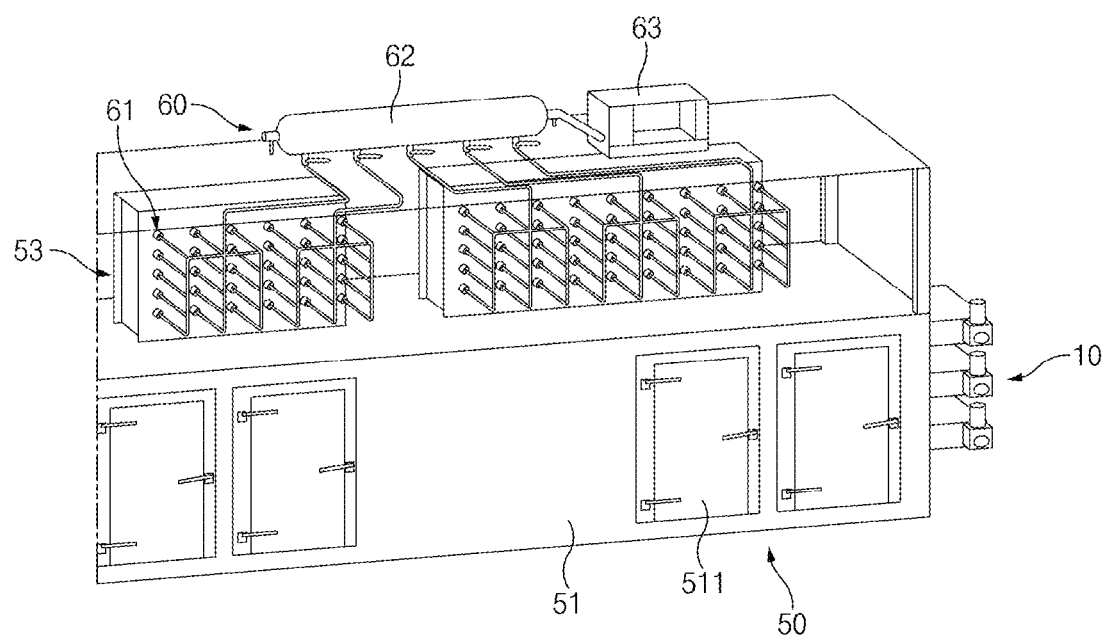
FIG. 11 is a perspective view illustrating a freezing unit of a food processing system according to an embodiment of the present invention.

FIG. 11 is a perspective view illustrating the freezing unit 50 of the food processing system 1 according to an embodiment of the present invention.

The freezing unit 50 is a component provided to freeze the foods F pre-frozen and transported by the transport unit 10. The freezing unit 50 may be disposed behind the pre-freezing unit 40. The freezing unit 50 may include a freezing chamber 51 for defining a freezing space therein. The freezing chamber 51 may have a shape of a box that is opened in the front and rear direction. The transport unit 10 may pass through openings of the freezing chamber 51 in the front and rear direction. Thus, the foods F transferred by the transport unit 10 in the rear direction may be frozen while passing through the freezing space.

The freezing unit 50 may include a freezing module that provides cool air that is cooled air. That freezing module may include a freezing air providing means and a freezing air generation means 53. The freezing air providing means may be disposed in the freezing chamber 51 to forcibly supply the air cooled with the refrigerant to the freezing space. The freezing air generation means 53 may cool the air through heat exchange between the refrigerant and the air and provide the freezing air providing means with the cooled air. The freezing air generation means 53 may be disposed behind the freezing chamber 51. The freezing air generation means 53 may be a freezing device using a refrigerant such as R-404 or R-507.

The temperature in the freezing unit 50 may be −37° C. to −40° C., and the foods F discharged from the freezing unit 50 may have a temperature of −5° C. to −10° C., preferably −7° C. The foods F transported by the transport unit 10 may be gradually cooled while passing through the cooling unit 30, the pre-freezing unit 40, and the freezing unit 50 in this order, thereby minimizing a sharp temperature change of the foods F and finally discharging the foods F in a frozen state. As the cooling is gradually performed, the load of the freezing unit 50 may be reduced.

At least one of the cooling unit 30, the pre-freezing unit 40, or the freezing unit 50 may include a plurality of air providing means, each of which is disposed at a position corresponding to each of the levels 11, 12 and 13 of the transport unit 10 and forcibly supplies the air. Such an air providing means may be the outside air providing means 33 in the cooling unit 30, the pre-freezing air providing means in the pre-freezing unit 40, or the freezing air providing means in the freezing unit 50. The air providing means may absorb and process outside air to provide each of the chambers 31, 41 and 51 with the air, but may reprocess the air used in the chamber 31, 41 or 51 to provide the air back for the chamber 31, 41 or 51.

Among the plurality of air providing means, the air providing means disposed at the positions corresponding to different levels, respectively, may operate independently of each other. Thus, the foods F seated on the transport levels 11, 12 and 13 may be processed at different temperatures, respectively. For such individual control, a temperature sensor that obtains the temperature may be disposed at a position adjacent to each of the transport levels 11, 12 and 13. The air providing means corresponding to the temperature sensor may be controlled according to the temperature obtained by the temperature sensor.

At least one of the cooling unit 30, the pre-freezing unit 40, or the freezing unit 50 may include a damper for air volume control, which is provided to adjust a flow rate of the air provided for the plurality of air providing means. The damper for air volume control may have a pipe-shaped appearance and be disposed in the middle of a flow path through which the air flows. The damper may include a damper member, which is disposed inside the damper and of which a position is adjustable, and adjust the position of such a damper member, thereby adjusting the air volume provided through the damper for air volume control.

Air curtains provided to spray air onto the foods F may be provided at an inlet and an outlet, respectively, of each of the cooling unit 30, the pre-freezing unit 40, and the freezing unit 50. As the air curtains are disposed, foreign matters present on the foods F transported by the transport unit 10 may be removed, and foreign matters other than the foods F may be blocked from being introduced into the cooling unit 30, the pre-freezing unit 40, and the freezing unit 50.

The pre-freezing unit 40 and the cooling unit 30 cool the foods F but does not freeze the foods F and thus, may constitute a cooler. That is, the cooler is a part that is disposed between the freezing unit 50 and the steaming unit 20 and provided to cool the foods F, which are steamed and transported by the transport unit 101, before the foods F are transferred to the freezing unit 50.

Each of the cooling unit 30, the pre-freezing unit 40, and the freezing unit 50 may have left and right side surfaces, each of which also has an opening defined therein and in which a cooling door 311, a pre-freezing door 411, or a freezing door 511, which is a door for opening and closing the opening, is disposed. Cleaning means for cleaning the chambers 31, 41 and 51 by injection of a material such as air, steam, cleaning water and cleaning agents, may be disposed also in the cooling unit 30, the pre-freezing unit 40, and the freezing unit 50, respectively.

The cooling unit 30, the pre-freezing unit 40, and the freezing unit 50 may have different lengths in the front and rear direction. The lengths of the cooling unit 30, the pre-freezing unit 40 and the freezing unit 50 in the front and rear direction may be longer in the reverse order mentioned.

Defrosting Unit 60

The defrosting unit 60 is a component that is connected to the freezing unit 50 so as to remove frost formed in the freezing unit 50. The defrosting unit 60 may be provided to inject the air into the freezing unit 5 and remove the frost. The defrosting unit 60 may inject the air into the freezing module, not into the freezing chamber 51, and remove the frost occurring in the freezing module.

The defrosting unit 60 may include a plurality of defrosting nozzles 61, an air tank 62, and an air drying module 63. The defrosting nozzles 61 may be connected to the freezing module and provided to inject air into the freezing air generation means 53 of the freezing module. The defrosting nozzles 61 may be connected to the air tank 62 through pipes, and the air tank 62 may deliver the dried air stored therein to the defrosting nozzles 61 through the pipes. A valve may be disposed in each of the pipes and adjust an amount of the air delivered to each of the defrosting nozzles 61. The air drying module 63 may be connected to the air tank 62, and intake and dry the air inflowing from the outside so that the air is stored in the air tank 62. The air drying module 63 may be a dehumidifier that performs dehumidification in such a manner that air is cooled to condense steam, or performs dehumidification using an absorbent such as silica gel. However, the type of the air drying module 63 is not limited thereto.

The defrosting nozzle 61 may be disposed to face a portion of the freezing air generation means 53, which is prone to the frost. As illustrated, the defrosting nozzles 61 may be disposed in a grid shape to face the frozen air generation means 53 at a side surface of the frozen air generation means 53 and inject high-pressure air to physically remove the frost.

Heretofore, even though all components configuring the embodiments of the present disclosure are described to be combined as one unit or to operate as a combination thereof, the present disclosure is not limited to these embodiments. That is, within the scope of the present disclosure, all components may be selectively combined to one or more thereof to operate as a combination. The term such as "comprising," "configure", or "having", specifies the presence of components, unless there is a clearly different meaning in the present disclosure, but do not preclude the presence thereof and should be construed to further include other components. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The description of the present invention is intended to be illustrative, and various changes and modifications can be made by those of ordinary skill in the art to which the present invention pertains, without departing from the spirit and scope of the present invention as defined by the appended claims. Therefore, the embodiments set forth herein are to describe the technical spirit of the present invention and not to limit. The scope of the technical spirit of the present invention is not limited by the embodiments. Moreover, the protective scope of the present invention should be determined by reasonable interpretation of the appended claims and all technical concepts coming within the equivalency range of the present application should be interpreted to be in the scope of the right of the present application.

The invention claimed is:

1. A food freezing device comprising:
   a transport unit having multiple vertically spaced levels provided so as to continuously transport food;
   a cooling unit configured to cool the foods transported by the multiple levels of the transport unit;
   a pre-freezing unit configured to pre-freeze the foods transported by the multiple levels of the transport unit after having been cooled;
   a freezing unit configured to freeze the foods transported by the multiple levels of the transport unit after having been pre-frozen; and
   a defrosting unit connected to the freezing unit so as to remove frost that forms inside the freezing unit.

2. The food freezing device of claim 1, wherein the defrosting unit is provided to inject air into the freezing unit to remove the frost.

3. The food freezing device of claim 2, wherein the freezing unit comprises a freezing chamber having an inner space, through which the multiple levels of the transport unit passes, and a freezing module configured to provide the inner space with cool air, and
   the defrosting unit comprises a plurality of defrosting nozzles connected to the freezing module and configured to inject the air.

4. The food freezing device of claim 2, wherein the defrosting unit comprises an air drying module configured to absorb and dry outside air, and injects the air dried by the air drying module into the freezing unit.

5. The food freezing device of claim 1, wherein at least one of the cooling unit, the pre-freezing part, or the freezing unit comprises a plurality of air providing means disposed at positions corresponding to the levels of the multiple levels of the transport unit, respectively, and configured to forcibly supply the air, and
   among the plurality of air providing means, the air providing means disposed at different levels, respectively, operate independently of each other.

6. The food freezing device of claim 5, wherein at least one of the cooling unit, the pre-freezing unit, or the freezing unit further comprises a damper for air volume control configured to adjust a flow rate of the air provided for the plurality of air providing means.

7. The food freezing device of claim 1, wherein the cooling unit cools the foods in such a manner that outside air is forcibly supplied to the foods.

8. The food freezing device of claim 1, wherein each of the cooling unit, the pre-freezing unit, and the freezing unit has an inlet and an outlet, each of which is provided with an air curtain configured to spray air onto the foods.

9. A food processing system comprising:
   a transport unit having multiple vertically spaced levels provided so as to continuously transport food;
   a steaming unit configured to steam the foods transported by the multiple levels of the transport unit; and a freezing unit configured to freeze the foods steamed and transported by the multiple levels of the transport unit.

10. The food processing system of claim 9, wherein each of the levels of the transport unit comprises:

a conveyor configured to transport the foods; and a transport cover configured to cover the conveyor above the conveyor passing through the steaming unit.

11. The food processing system of claim 10, wherein the conveyor extends in a front and rear direction and is provided so that the plurality of foods are arranged in a left and right direction and the front and rear direction, and each of the levels of the transport unit comprises a plurality of baffle plates protruding from the transport cover toward the conveyor, extending in the left and right direction, and disposed apart from each other in the front and rear direction.

12. The food processing system of claim 11, wherein each of the plurality of baffle plates accommodates a thermal insulation material therein.

13. The food processing system of claim 9, wherein the steaming unit comprises a steaming chamber having an inner space, through which the multiple levels of the transport unit passes in the front and rear direction, and a steaming door part configured to open and close openings defined in the steaming chamber in the left and right direction, wherein the steaming door part comprises an inner steaming door and an outer steaming door disposed outside the inner steaming door.

14. The food processing system of claim 9, wherein the steaming unit comprises a plurality of steam providing means disposed at positions corresponding to the multiple levels of the transport unit, respectively, and configured to forcibly supply steam, wherein among the plurality of steam providing means, the steam providing means disposed at positions corresponding to different levels, respectively, operate independently of each other.

15. The food processing system of claim 9, further comprising at least one cooler disposed between the freezing unit and the steaming unit and configured to cool the foods steamed and transported by the multiple levels of the transport unit before the foods are transferred to the freezing unit.

\* \* \* \* \*